July 28, 1925.
P. ARBON
1,547,196
CONTROL HEAD OPERATING MEANS
Filed Aug. 29, 1924
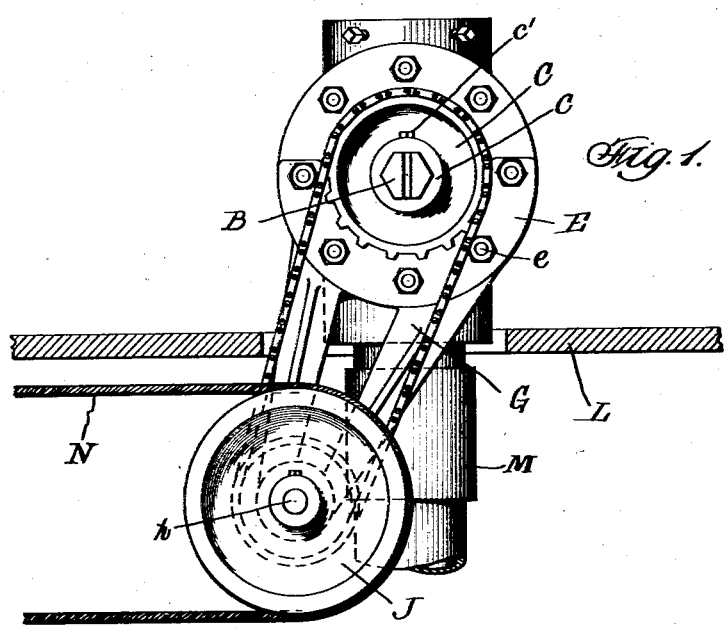
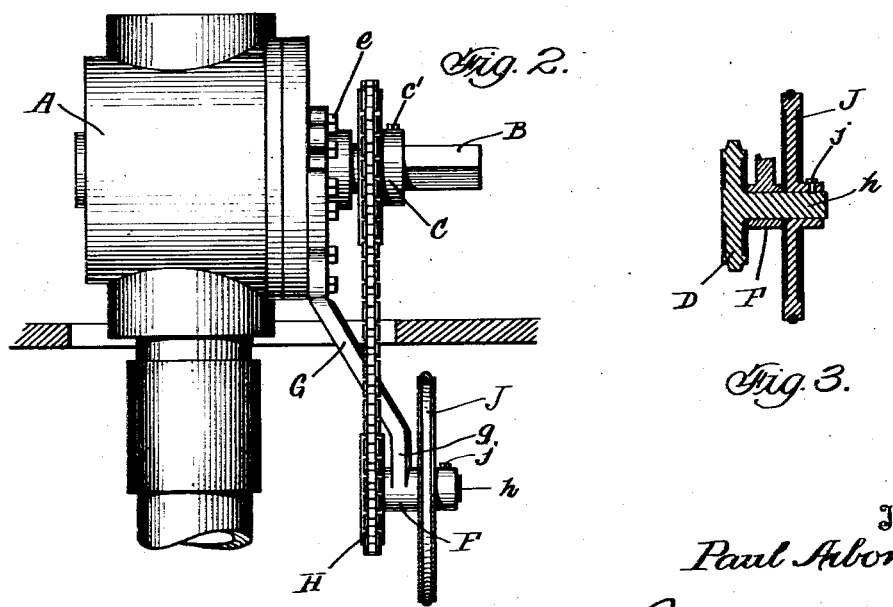
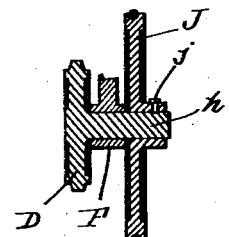
Inventor
Paul Arbon.
By Ralph L. Barrett
Attorney Patented July 28, 1925.

1,547,196

UNITED STATES PATENT OFFICE.

PAUL ARBON, OF TULSA, OKLAHOMA.

CONTROL-HEAD-OPERATING MEANS.

Application filed August 29, 1924. Serial No. 734,914.

*To all whom it may concern:*

Be it known that PAUL ARBON, a subject of the King of Great Britain, residing at Tulsa, in the county of Tulsa and State of Oklahoma, has invented certain new and useful Improvements in Control-Head-Operating Means, of which the following is a specification.

The device relates to the provision of means for manipulating a control head from a distance.

The foregoing is accomplished by keying a sprocket on the stem of the control head valve; supporting a corresponding sprocket of smaller diameter beneath the first mentioned sprocket by means of a suitable hanger, operably connecting the two sprockets by means of a suitable sprocket chain and providing operating means for same.

Referring to the accompanying drawings in which similar characters of reference indicate similar parts throughout the several views, Fig. 1 is an end elevation, Fig. 2 is a side elevation, and Fig. 3 is a section through the lower sprocket and drive.

In detail, the conventional control head is shown at A in which is arranged a valve having the stem B extending therefrom. Keyed to the valve stem B is a sprocket wheel C having integral hub c and locking means in the form of set screw c'. This arrangement permits longitudinal adjustment with relation to the valve stem and also removal of the sprocket when desired. For supporting the lower sprocket D, a hanger is provided and includes the upper arc shaped portion E, lower off-set bearing F and intermediate shank portions G. The arc-shaped portion E is provided with a series of suitably spaced perforations e for registration with the bolt holes in the casing head and reception of the bolts e' provided therefor.

The off-set portion F includes the vertical shank portion g and the bearing through which the lower sprocket shaft h passes. The sprockets C and D are connected by a chain H.

The intermediate shank portions G are inclined at a suitable angle to properly off-set the driving pulley J.

The arrangement of this driving pulley J on the shaft h is more clearly shown in Fig. 3. With reference to this figure, it will be seen that the shaft carried by the off-set bearing F is formed integral with the sprocket D and projects laterally from the central portion thereof. This shaft indicated by reference character h is of sufficient length to extend through the bearing, outwardly and support the grooved pulley J, the latter being fixed thereon by means of the set screw j.

For the purpose of more clearly illustrating the application of the invention, the conventional well flooring is shown at L and the tubing from the well at M. The cable N, carried by the grooved pulley J extends to any desired operating means at any suitable distance to accomplish the necessary results.

What I claim as new and useful and desire to secure by Letters Patent is:—

1. A control head having a valve and valve stem, a sprocket mounted on said valve stem, a hanger supported by said control head having a bearing portion, a shaft supported by said bearing, a sprocket on said shaft, a sprocket chain connecting said sprockets, and means for driving said sprockets, said last named sprocket and said means being separated by said bearing portion.

2. A control head having a valve and valve stem, a sprocket mounted on said valve stem, a hanger supported by said control head and having an off-set bearing portion, a shaft supported by said bearing, a sprocket on said shaft, a sprocket chain connecting said sprockets, and means for driving said sprockets.

3. A control head having a valve and valve stem, a sprocket mounted on said valve stem, a hanger having an arc-shaped upper portion and an off-set lower bearing portion fixed to said control head, a shaft supported by said bearing, a sprocket on said shaft, a sprocket chain connecting said sprockets, and means for driving said sprockets.

4. A control head having a valve and valve stem, a sprocket fixed on said valve stem, a hanger having an arc-shaped upper portion and an offset lower bearing portion fixed to said control head, a sprocket formed with an integral shaft portion for arrangement in said off-set bearing, and a pulley mounted on said shaft.

5. A control head having a valve and a valve stem, a sprocket adjustably mounted on said valve stem, a hanger having an arc-shaped upper portion and an off-set lower bearing portion fixed to said control head, a sprocket formed with an integral shaft adapted to extend through and beyond the outer face of said off-set bearing, a grooved pulley arranged on said shaft adjacent the outer face of said bearing, means for locking said pulley on said shaft and means for driving said pulley.

6. A hanger comprising an upper arc-shaped portion formed with a series of spaced perforations, integral supporting arms extending downwardly and outwardly from said arc-shaped portion and at an angle to the transverse axis thereof, the lower portion of the supporting arms being bent to extend vertically, and a bearing supported by the extremities of the vertical portions of said arms.

In testimony whereof I affix my signature.

PAUL ARBON.